United States Patent [19]

Mann et al.

[11] Patent Number: 4,761,099

[45] Date of Patent: Aug. 2, 1988

[54] PROCESS FOR STRENGTHENING AND SEALING GEOLOGICAL FORMATIONS

[75] Inventors: Max Mann, Odenthal; Manfred Kapps, Bergisch-Gladbach; Frank Meyer; Hans Mehesch, both of Essen; Wolfgang Cornely, Gladbeck; Bernhard Maidl, Bochum-Stiepel; Dietrich Stein; Knud Gerdes, both of Bochum, all of Fed. Rep. of Germany

[73] Assignees: Bayer Aktiengesellschaft, Leverkusen; Bergwerksverband GmbH, Essen, both of Fed. Rep. of Germany

[21] Appl. No.: 31,488

[22] Filed: Mar. 27, 1987

[30] Foreign Application Priority Data

Apr. 2, 1986 [DE] Fed. Rep. of Germany ....... 3610935

[51] Int. Cl.$^4$ .............................................. E02D 3/12
[52] U.S. Cl. .................................... 405/264; 166/295
[58] Field of Search .............. 405/260, 261, 263, 264, 405/266; 166/295, 294; 523/132; 528/905

[56] References Cited

U.S. PATENT DOCUMENTS 3,623,330 11/1971 Nakade et al. .
3,698,196 10/1972 Jankowski et al. .
4,113,014 9/1978 Kubens et al. ...................... 166/295
4,114,382 9/1978 Kubens et al. ...................... 405/264
4,452,551 6/1984 Arndt et al. ........................ 405/264
4,454,252 6/1984 Meyer ............................. 405/264 X
4,475,847 10/1984 Cornely et al. ..................... 405/264
4,497,595 2/1985 Meyer et al. ....................... 405/261

FOREIGN PATENT DOCUMENTS 1758185 10/1970 Fed. Rep. of Germany .
3502997 7/1986 Fed. Rep. of Germany .
3532387 4/1987 Fed. Rep. of Germany .

OTHER PUBLICATIONS

F. Meyer, Reactive Kunstharze In Bergbau Gluckauf, V. 117, 1981, pp. 831 et seq.

Primary Examiner—David H. Corbin
Attorney, Agent, or Firm—Gene Harsh; Joseph C. Gil; Thomas W. Roy

[57] ABSTRACT

The present invention is directed to a process for strengthening and sealing geological formations which are moist or contain water, in particular loose stone, by the injection of a mixture which reacts to form polyurethane, characterized in that a polyisocyanate component is injected before injection of the reaction mixture.

8 Claims, No Drawings

PROCESS FOR STRENGTHENING AND SEALING GEOLOGICAL FORMATIONS

BACKGROUND OF THE INVENTION

1. Field of the Invention

This invention relates to a new process for strengthening and sealing geological formations which are moist or contain water by the injection of a mixture which reacts to form a polyurethane, characterized in that a polyisocyanate optionally containing auxiliary agents and additives is injected before injection of the mixture.

2. Description of the Prior Art

Both the strengthening and sealing of loose stone with organic resins such as one-component polyurethane systems and the strengthening and sealing of friable solid rock and coal by means of two-component polyurethane systems are known.

The injection of liquid synthetic materials capable of foaming, in particular two-component polyurethane systems, has for many years been used on a large scale in coal mining (DE-PS 1,758,185 F. Meyer, Reaktive Kunstharze im Bergbau, Glückauf 117 (1981) p. 831 et seq.)

In a typical process of this kind the two polyurethane components, i.e., the polyols and polyisocyanate, are delivered separately in the required proportions, brought together in front of a bore hole and continuously mixed. The mixture is then forced into the bore hole through a packer and transferred under pressure into the accessible cracks and gaps in which the resin subsequently hardens and elastically bonds the broken layers of rock and coal together.

Silicate pressings have been known in the art for fifty years, while the injection organic materials such as acrylamide gels and condensation resins, including the so called one-component polyurethane systems, have been introduced in recent times. In the process employing these systems, a polyurethane prepolymer containing solvent is mixed with the quantity of catalyst required for the purpose and then injected as a single component. The isocyanate groups of the polyurethane prepolymer react with the water in the substratum. This reaction is accompanied by vigorous foaming and a polyurethane-polyurea resin is formed (DE-AS No. 1,914,554).

This process has the following disadvantages:

(1) the solvent, which is not chemically bound, remains in the ground;
(2) any polyurethane prepolymer which has not been mixed with sufficient water does not harden; and
(3) the material is comparatively expensive due to the method employed for its preparation.

It therefore seemed an obvious solution to employ the two-component process also known from coal mining technology. These systems are solvent-free. The mixture of the two components invariably hardens and the components are relatively inexpensive. Experiments have shown that when the isocyanate/polyol reaction has to compete with the isocyanate/water reaction, the latter would predominate and complete strengthening would therefore fail to occur. The strength properties obtained with suitable two-component systems are invariably higher than those obtained with one-component systems, even when applied to loose stone saturated with water. However, there is one important disadvantage, i.e., that a portion of the isocyanate may react with the water at the interface between the injected material and the rock. Thus a portion of the polyol fails to be chemically incorporated into the polymer and may get into the subterranean water. This phenomenon is one consideration against the use of two-component systems in loose stone carrying water.

It has now surprisingly been found that this disadvantage can be substantially reduced by first injecting a polyisocyanate and subsequently injecting a mixture which reacts to form a polyurethane. If this procedure is adopted, the polyisocyanate injected in advance of the reaction mixture reacts with water to from a polyurea which subsequently combines with the polyurethane forming reaction mixture introduced by the second injection to form an enveloping protective layer which prevents the polyol from entering the subterranean water. The reaction of the polyisocyanate with water is quantitative so that neither polyisocyanates nor conversion products thereof can dissolve in the surrounding ground water.

SUMMARY OF THE INVENTION

The present invention is directed to a process for strengthening and sealing geological formations which are moist or contain water, in particular loose stone, by the injection of a mixture which reacts to form polyurethane, characterized in that a polyisocyanate component is injected before injection of the reaction mixture.

DETAILED DESCRIPTION OF THE INVENTION

Two components are thus injected in the process according to the invention: first, a polyisocyanate optionally containing auxiliary agents and additives and, second, a component which reacts to form a polyurethane and which contains as its main constituent a polyol component in addition to a polyisocyanate component.

The polyisocyanate component is preferably a polyisocyanate or polyisocyanate mixture of the diphenyl methane series which is liquid at room temperature, i.e. phosgenation products of aniline/formaldehyde condensates or derivatives of these polyisocyanates which are liquid at room temperature and contain carbodiimide groups, biuret groups, urethane groups or allophanate groups. Phosgenation products of aniline/formaldeyhde condensates which have undergone no further chemical modification and generally have an isocyanate content of about 32 to 33.5% by weight and a viscosity at 25° C. of about 50 to 400 mPa.s are particularly preferred. These polyisocyanate mixtures of the diphenyl methane series contain 4,4'-diisocyanatodiphenyl methane, varying quantities of 2,4'-diisocyanatodiphenyl methane and, in addition, up to about 50% by weight, preferably up to about 20% by weight of higher homologues of these isomers. Diisocyanates are also suitable if they are liquid at room temperature. Examples include mixtures of 4,4'-diisocyanatodiphenyl methane and 2,4'-diisocyanatodiphenyl methane in which the proportion of 2,4'-isomers based on the total mixture is generally about 40 to 70% by weight. These diisocyanate mixtures have an exceptionally low viscosity, of about 10 to 30 mPa.s/25° C. Reaction products containing urethane groups based on these diand polyisocyanates are also suitable. They may be obtained by a reaction of the polyisocyanates with polyhydric alcohols having a molecular weight of 62 to about 3000, preferably with polyols having a molecular weight of about 134 to 3000 and containing ether groups. The reaction is carried out at a NCO/OH molar ratio of about 1:0.005 to 1:0.3.

In the process according to the invention, this polyisocyanate component may be used alone or mixed with auxiliary agents and additives. Examples of such auxiliary agents and additives include catalysts for accelerating the NCO/water reaction, e.g. tertiary amines such as N,N-dimethyl benzylamine or triethylene diamine; lactams such as ε-caprolactam which also acts as catalyst; emulsifiers to improve the contact of the polyisocyanate with moisture such as ethoxylated nonyl phenyl; or defoamers to prevent excessive foaming which would reduce the strength such as long chained, unsaturated fatty acids or their polymerization products.

The second component to be injected in the process according to the invention is a reaction mixture which reacts to form a polyurethane, i.e. a two-component mixture containing a polyisocyanate component and a polyol component. This mixture may also contain the usual auxiliary agents and additives.

The polyisocyanate component in this reaction mixture is based on polyisocyanates of the type exemplified above and may be the same polyisocyanates as those initially used or different. The polyol component of the reaction mixture is based on polyhydroxyl compounds known from polyurethane chemistry which have molecular weights of 62 to about 10,000, preferably 400 to about 4000 and have a hydroxyl functionality of 2 to 4, preferably 2 to 3. These polyhydroxyl compounds are generally mixtures of several components although pure polyhydroxyl compounds, i.e. individual compounds, may in principle be used. When single polyhydroxyl components are used, the conditions given above concerning the molecular weight and hydroxyl functionality apply to these individual compounds; whereas, in the case of mixtures they apply to the average value of these mixtures.

The polyhydroxyl compounds used may be simple polyhydric alcohols having a molecular weight of 62 to 400 such as ethylene glycol, propane-1,2-diol, trimethylol propane, glycerol, diethylene glycol, dipropylene glycol, triethylene glycol, tripropylene glycol, and/or pentaerythritol. The relatively high molecular weight polyether polyols known from polyurethane chemistry, which preferably have a molecular weight of 400 to about 4000 are preferred. These polyether polyols may be obtained by the alkoxylation of simple polyhydric alcohols of the type mentioned above or mixtures thereof with higher functional starters such as sorbitol or sucrose. The alkoxylating agents used for this reaction include ethylene oxide and propylene oxide with propylene oxide being preferred. The polyol components may also contain other polyhydroxyl compounds known from polyurethane chemistry such as castor oil or polyester polyols which may be obtained by the reaction of polyhydric alcohols of the type exemplified above with polybasic carboxylic acids such as adipic acids, phthalic acid and/or phthalic acid anhydride. These polyester polyols preferably have a molecular weight (determined osmometrically) of 400 to about 4000. The polyol components may also contain small quantities of water (e.g. up to about 2% by weight).

To prepare the reaction mixtures, the polyisocyanates and polyhydroxyl compounds are mixed together in the proportions required to provide about 0.5 to 2, preferably about 0.9 to 1.5 isocyanate groups for each isocyanate reactive group (in particular hydroxyl groups). The components are mixed in known manner, preferably by means of static mixers of the type used, for example, for strengthening rock in coal mining.

The reaction mixture may also contain the usual auxiliary agents and additives, especially those mentioned above. The auxiliary agents and addtivies may be added to either the polyisocyanate component or the polyol component.

The sealing effect obtained by the reaction of the polyisocyanate with the water or moisture of the geological formation which is to be strengthened or seled off is generally sufficient if the sealing layer formed has a thickness of about 1 to 26%, preferably about 5 to 20% of the radius of the injection body. By "injection body" is meant the region of geological formation which is to be strengthened and/or sealed off by one injection process (including both the polyisocyanate injection and the polyurethane injection). The size of the region capable of being sealed off and/or strengthened by one injection process depends, of course, primarily upon the geological nature of the formation. The looser and more porous the geological formation, the larger this region will be. The size of the region may be determined, for example, by means of a preliminary test using a mixture which reacts to form polyurethane. When the region covered by one injection process has been determined by means of such a preliminary experiment, the quantity of polyisocyanate used for sealing (first injection) and the quantity of mixture which reacts to form polyurethane (second injection) can be calculated on the basis of figures given above for the thickness of the sealing layer. For the sake of simplicity, it may be assumed that the polyisocyanate (first injection and the reaction mixture (second injection) foam to a comparable extent.

Assuming that the thickness of the sealing layer (produced by the first injection with polyisocyanate) is about 1 to 26%, preferably about 5 to 20% of the radius of the injection body, a simple calculation using the equation $$V_I/V_G = (a/100)^3 - 3(a/100)^2 + 3\, a/100$$

($V_I$=volume of the initial injection of polyisocyanate;

$V_G$=total volume of substances injected;

a=thickness of sealing layer in %, based on the radius of the injection body)

shows that the quantity of polyisocyanate to be injected initially amounts to about 3 to 60%, preferably about 15 to 50% of the total volume of substances injected.

The process according to the invention starts with the first injection, i.e. the injection of "pure polyisocyanate" which may, as mentioned above, contain auxiliary agents and additives. The second injection immediately follows the first injection before the polyisocyanate introduced during the first injection has completed its reaction. The polyisocyanate of the first injection is driven forward by the injection front of the second injection and is not penetrated by the second injection. At least a portion of the polyisocyanate of the first injection reacts with the water or moisture content of the geological formation.

The invention is further illustrated but is not intended to be limited by the following examples in which all parts and percentages are by weight unless otherwise specified.

EXAMPLES

Injection experiments are carried out on a 1:1 scale to assess the amount of ground water. A cylindrical pot 1 meter in height and 1 meter in diameter was filled in layers with loose stone having a particle-size distribution curve of 0.2 to 2 mm and then compacted with an electric ram. At the end of this procedure, the pore content of the loose stone was about 35%. After the pot has been closed, a pressure cushion was applied to simulate a depth of 10 meters and the pot was then flooded with water.

A total quantity of 63 liters of injection material (composed of material for the first injection and material for the second injection) was then injected into the loose stone through an opening in a previously installed pipe sleeve so that, assuming a volumetric increase of the injection material by 50%, an approximately spherical strengthened body having a mean radius of 0.4 meters and a surface area of 2.0 m$^2$ was obtained.

24 hours after the injection, water (120 l/h) was passed via six inlet tubes at the bottom of the pot and six outlet tubes in the lid of the pot to stimulate a filtration rate under flow of 6 m/d on the surface of the strengthened injection body.

The injection process described above consisted of two successive individual injections. The material used for the first injection was a polyisocyanate component based on a polyisocyanate mixture of the diphenyl methane series prepared by phosgenation of an aniline/formaldehyde condensate, having an isocyanate content of 31% by weight and a viscosity at 25° C. of 140 mPa.s. The reaction mixture for the second injection, which reacted to form a polyurethane, was based on a mixture of the above mentioned polyisocyanate with a polyol component in proportions corresponding to an equivalent ratio of isocyanate groups to isocyanate reactive groups of 1.35:1. The polyol component of this mixture was a mixture 100 parts by weight of polypropylene glycol having an OH number of 265, 40 parts by weight of a product having an OH number of 380 and prepared by propoxylating a starter mixture solution of sugar in water in a molar ratio of sugar:water of 1:5, 0.8 parts by weight of ε-caprolactam, 1 part by weight of water and 4 parts by weight of 1,3-dihydroxy propane.

EXAMPLE 1

The required thickness of the sealing layer was calculated to be 5.5 cm. 23 liters of the above mentioned polyisocyanate component (first injection) followed by 40 liters of the above mentioned mixture which reacts to form polyurethane (second injection) were injected. The polyol concentration in the rinsing water amounted to 7.5 mg/l during the first days. When converted to a filtration rate based on a flow of 1 m/d and a surface of 1 m$_2$, the polyol concentration corresponds to a removal of polyol of 1.8 g/d.

EXAMPLE 2

The required thickness of the sealing layer was calculated to be 9 cm. 34 liters of the above mentioned polyisocyanate (first injection) followed by 29 liters of the above mentioned mixture reacting to form a polyurethane (second injection) were injected. The concentration of polyol in the rinsing water was 3.1 mg/l. On conversion, this corresponds to a removal of polyol of 0.75 g/d.

EXAMPLE 3 (Comparison Example)

63 liters of the polyurethane forming mixture of polyisocyanate and polyether polyol described in Example 1 were injected without a preliminary injection. The concentration of polyol in the rinsing water was 17.5 mg/l which, when converted corresponds to a removal of polyol of 4.2 g/d.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for strengthening and sealing geological formations which are moist or contain water which comprises
   (a) injecting a polyisocyanate component into said geological formation and
   (b) subsequently injecting a mixture of polyol and polyisocyanate which reacts to form a polyurethane.

2. The process of claim 1 wherein said polyisocyanate of step (a) and (b) is a liquid phosgenation product of an aniline/formaldehyde condensation reaction and the polyol comprises a polyether polyol.

3. The process of claim 1 wherein the volume of polyisocyanate injected in step (a) is about 3 to 60% of the total volume of material injected in both steps (a) and (b).

4. The process of claim 2 wherein the volume of polyisocyanate injected in step (a) is about 3 to 60% of the total volume of material injected in both steps (a) and (b).

5. The process of claim 1 wherein said geological formation is loose stone.

6. The process of claim 2 wherein said geological formation is loose stone.

7. The process of claim 3 wherein said geological formation is loose stone.

8. The process of claim 4 wherein said geological formation is loose stone.

* * * * *